(12) United States Patent
Jun

(10) Patent No.: US 6,567,152 B2
(45) Date of Patent: May 20, 2003

(54) METHOD OF FABRICATING LIQUID CRYSTAL DISPLAY

(75) Inventor: Jae Hong Jun, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 209 days.

(21) Appl. No.: 09/748,867

(22) Filed: Dec. 28, 2000

(65) Prior Publication Data

US 2001/0020998 A1 Sep. 13, 2001

(30) Foreign Application Priority Data

Dec. 29, 1999 (KR) ........................................ 1999-64498

(51) Int. Cl.[7] ............................................ G02F 1/1339
(52) U.S. Cl. ........................ 349/190; 349/187; 349/189
(58) Field of Search ................................. 349/187, 189, 349/190

(56) References Cited

U.S. PATENT DOCUMENTS

| | | | | |
|---|---|---|---|---|
| 5,263,888 A | * | 11/1993 | Ishihara et al. | 349/190 |
| 6,001,203 A | * | 12/1999 | Yamada et al. | 156/106 |
| 6,055,035 A | * | 4/2000 | von Gutfeld et al. | 349/187 |
| 6,304,311 B1 | * | 10/2001 | Egami et al. | 349/187 |

* cited by examiner

Primary Examiner—James Dudek
(74) Attorney, Agent, or Firm—McKenna Long & Aldridge LLP

(57) ABSTRACT

A method of fabricating a liquid crystal display wherein a sealant on a substrate enables a pool of liquid crystal to be formed. Another substrate is then placed in location on the sealant. The sealant joins the substrates together with the liquid crystal disposed between the substrates. Placing the substrate on the sealant is beneficially performed under a vacuum. Additionally, the sealant is beneficially semi-solid and light cured.

22 Claims, 3 Drawing Sheets

METHOD OF FABRICATING LIQUID CRYSTAL DISPLAY

BACKGROUND OF THE INVENTION

1. Field of the Invention

The present invention relates to a method of fabricating a liquid crystal display, and more particularly to a method of fabricating a liquid crystal display wherein a liquid crystal is placed in position before an upper plate is bonded to a lower plate.

2. Discussion of the Related Art

Generally, a liquid crystal display (LCD) includes an active matrix driving system of thin film transistors (TFT's) that act as switching devices. Since such LCDs can be made small and lightweight, they have become widely used as monitors for personal computers and notebook computers, in office equipment such as copy machines, and in portable equipment such as cellular phones and pagers.

Fabricating an active matrix LCD involves numerous steps, including substrate cleaning, substrate patterning, alignment layer formation, substrate joining and liquid crystal injection, and packaging. In substrate cleaning, alien substances are removed from the substrate. Substrate cleaning is usually performed both before and after substrate patterning of upper and lower substrates. Substrate patterning includes patterning an upper substrate and a lower substrate to incorporate required elements. The upper substrate is provided with elements such as color filters, a common electrode and a black matrix. The lower substrate is provided with elements such as data lines and gate lines, thin film transistors (TFT) arranged at intersections of the data lines and the gate lines, and a pixel electrodes. The pixel electrodes are formed at pixel areas between the data lines and the gate lines. Substrate joining and liquid crystal injection usually includes coating an alignment layer (orientation film) on a lower substrate, joining an upper substrate to the lower substrate, and injecting a liquid crystal into a gap that is formed between the lower and upper substrates. The injection hole for the liquid crystal is then sealed. In packaging, a tape carrier package (TCP) is mounted with gate drive integrated circuits (IC) and data drive integrated circuits in electrical contact with pads on the substrate.

A substrate joining and liquid crystal injection process will be described in more detail with reference to FIG. 1. FIG. 1 illustrates a conventional LCD fabrication process from a coating of an alignment layer until an inspecting step.

First, at step S2, a polyimide is coated on a substrate to provide an alignment layer. After being coated, the surface of the alignment layer is rubbed by a rubbing cloth or paper to produce a surface layer of polyimide molecules that are aligned in a constant direction, reference step S4. After rubbing, if the substrate being processed is an upper substrate, a stripe-shaped sealant is formed along the outer edge of the upper substrate, which is provided with color filters, reference step S6. During this process the sealant is not placed over a liquid crystal injection hole. However, if the substrate being processed is a lower substrate, spacers are sprayed onto the lower substrate, which includes an array of TFT's, see step S8. This help prevent the upper substrate and the lower substrate from sticking fast to each other after a later joining (step S12). After step S8, silver (Ag) is coated onto the lower substrate to enable an electrical connection between the upper substrate and the lower substrate, reference step S10.

After steps S6 (upper substrate) or step S10 (lower substrate), the upper substrate is joined to the lower substrate using the stripe-shaped sealant formed along the edge of the upper substrate, reference step S12. After the upper substrate and the lower substrate are joined, the liquid crystal display panel is cut into smaller panels, reference step S14. Then, a liquid crystal is injected through a liquid crystal injection hole defined in the upper substrate of each of the cut panels, step S16. After the liquid crystal is injected, the liquid crystal injection holes is sealed with a sealant, reference step S18. Any liquid crystal that leaked during the liquid crystal injection step is then cleaned up, reference step 20. Finally, as step S22, the quality of the liquid crystal display panel is inspected.

In the conventional substrate joining/liquid crystal injection process described above, since the liquid crystal is injected through a liquid crystal injection hole after the joining of the upper substrate to the lower substrate, a considerable period of time is required to perform the injection. Furthermore, some of the liquid crystal leaks out of the liquid crystal injection hole after injection. Additionally, as the LCD gets larger, the injection of the liquid crystal becomes less uniform.

SUMMARY OF THE INVENTION

Accordingly, it is an object of the present invention to provide a method of fabricating a liquid crystal display that is capable of a reduced liquid crystal injection time and a more uniform injection.

To achieve these and other objects of the invention, a method of fabricating a liquid crystal display device according to an embodiment of the present invention includes forming a semi-solid sealant having a closed-loop shape on one of the substrates. A liquid crystal is then located in the sealant area. The substrates are then joined together, beneficially using a vacuum, with the sealant sealing the liquid crystal layer in place.

The method of fabricating a liquid crystal display device further includes the step of forming a spacer on at least one of the substrates.

The method of fabricating a liquid crystal display device further includes the step of exposing the sealant with ultraviolet light. Such exposure is beneficially performed at atmospheric pressure.

A method of fabricating a liquid crystal panel having a plurality of unit cells according to another embodiment of the present invention includes forming a sealant on at least a first substrate of unit cells, with the sealant being semi-solid and having a closed loop shape. Then, locating a liquid crystal layer in the closed loop region, and then joining a second substrate to the first substrate. The liquid crystal panel is then cut into a plurality of unit cells. The step of joining is beneficially performed in a vacuum. The process further includes forming a spacer on at least one of the substrates. Beneficially, the sealant is cured by light, preferably ultraviolet light. Curing is beneficially performed at atmospheric pressure.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF AN ILLUSTRATED EMBODIMENT

Reference will now be made in detail to an illustrated embodiment of the present invention, the example of which is shown in the accompanying drawings.

Figure 1:
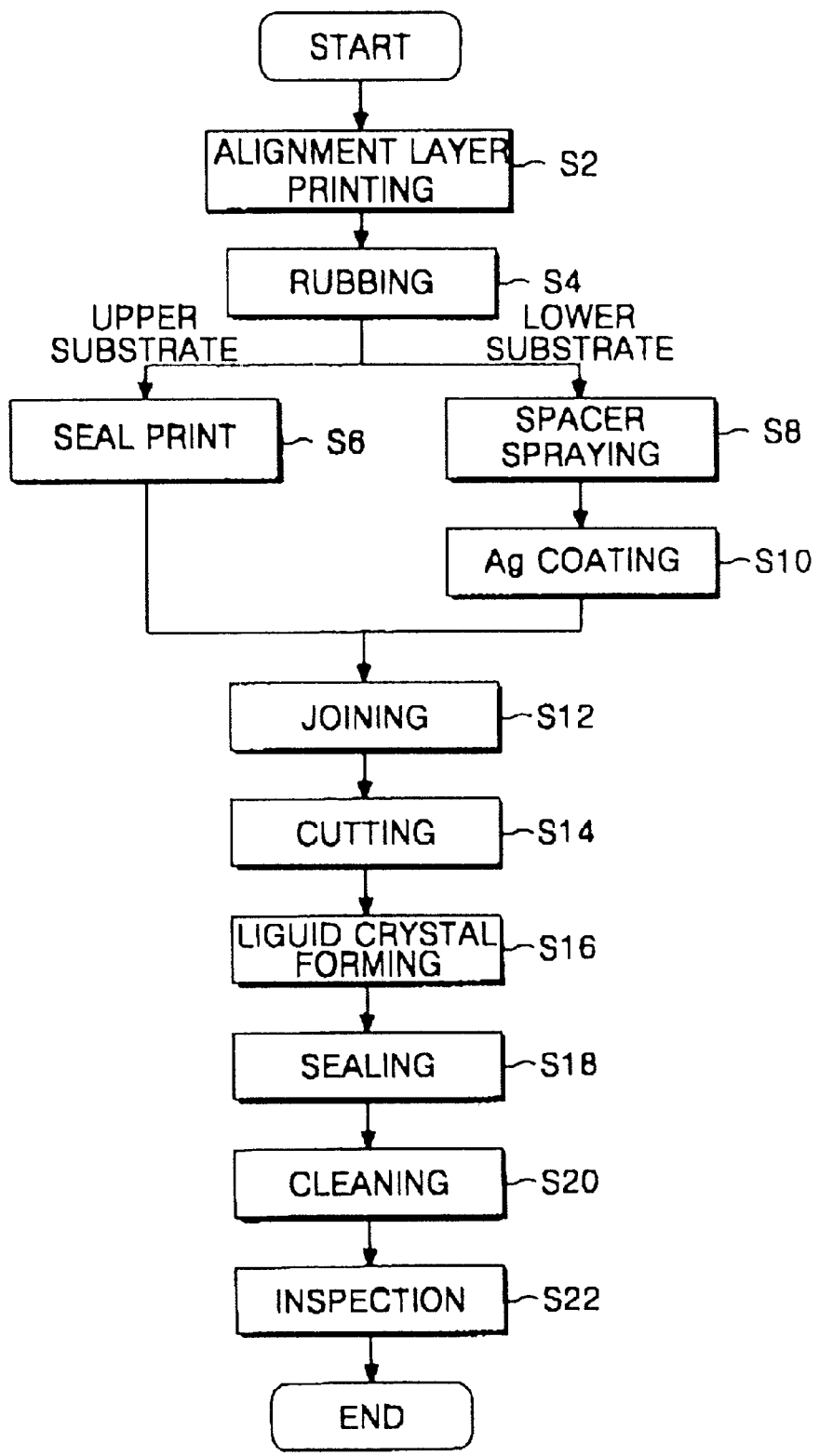
FIG. 1 is a flow chart representing a conventional method of fabricating a liquid crystal display.
Figure 2:
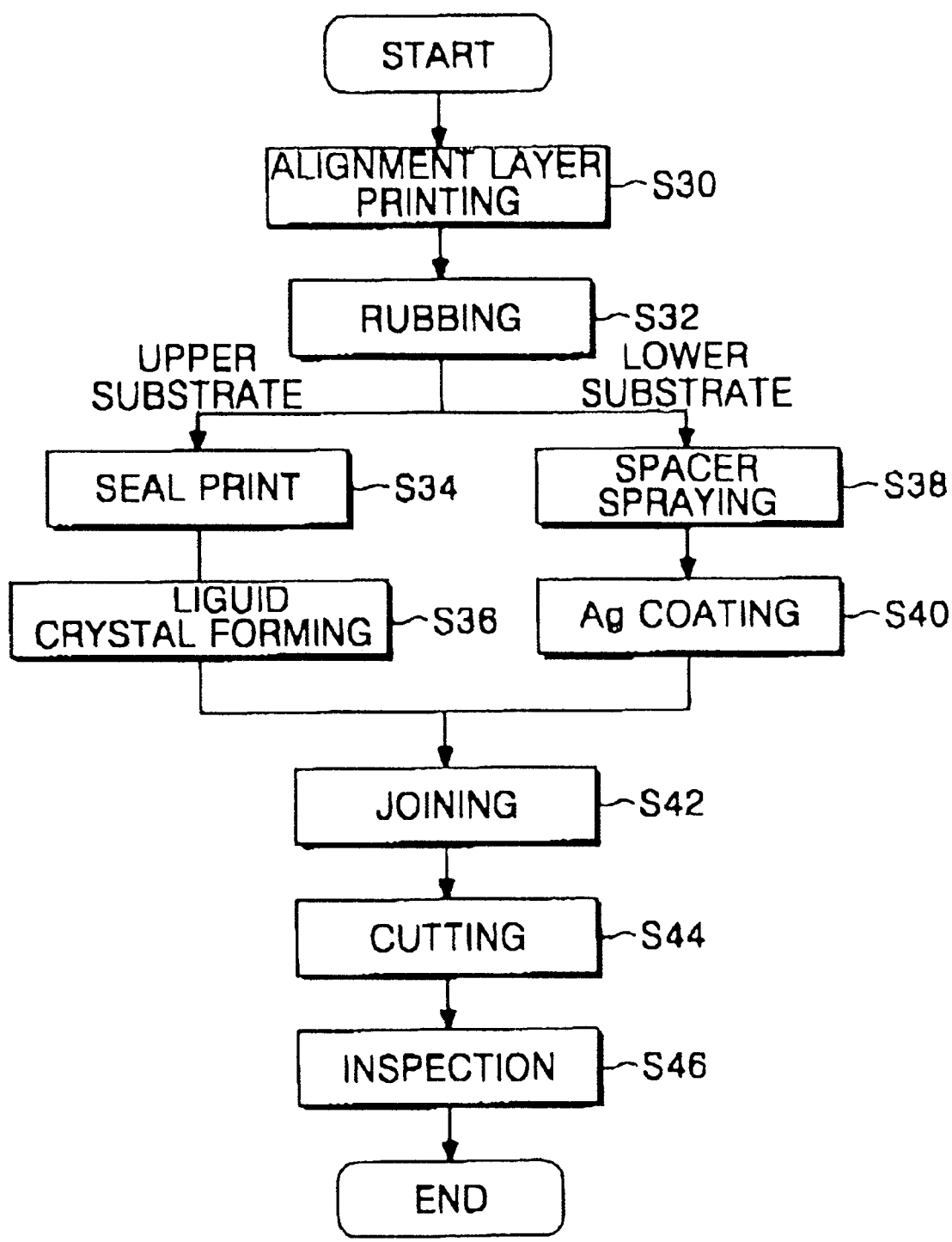
FIG. 2 is a flow chart representing a method of fabricating a liquid crystal display that is in accord with the principles of the present invention.

FIG. 2 is a flow chart of various processing steps of a method of fabricating a liquid crystal display. In particular, FIG. 2 provides the processing steps from the coating of an alignment layer until an inspection step. Referring to FIG. 2, at step S30, polyimide is coated on a substrate to provide for an alignment layer. After the polyimide is coated, the surface of the polyimide is rubbed by a rubbing cloth or paper to provide an alignment layer having a surface layer of polyimide molecules that align in a constant direction, reference step S32. If the substrate is an upper substrate, after rubbing, a stripe-shaped sealant is formed into a closed loop along the edges of the upper substrate (which includes color filters) to define a space for a pool of liquid crystal, reference step S34. After step 34, a liquid crystal is placed inside the space defined by the closed loop of the sealant, reference step 36.

However, if the substrate being formed is a lower substrate, after rubbing (step 32), spacers are sprayed onto the lower substrate (which is provided with an array of TFT's), reference step S38. The spacers prevent the upper substrate and the lower substrate from sticking fast to each other after a later joining step (step S42). After the spacers were sprayed onto the lower substrate, silver (Ag) is coated on the lower substrate to provide for electrical contact with the upper substrate, reference step S40.

The upper and lower substrates are then joined by placing the lower substrate on the stripe-shaped sealant along the edge of the upper substrate, reference step S42. After joining, the resulting liquid crystal display panel is then cut as required (to form individual cells), reference step S44. Finally, at step S46, the quality of the liquid crystal display panel is checked.

When compared with the previously discussed conventional LCD fabricating method, it should be apparent that the steps of sealing of the injection hole (step S18) and cleaning up leaked liquid crystal (step S20) have been eliminated.

Figure 3:
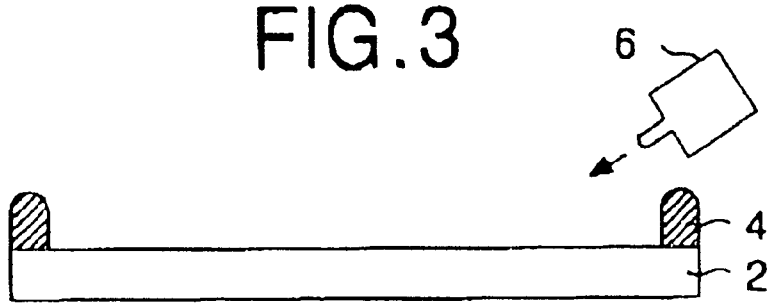
FIG. 3 to FIG. 5 illustrate the forming of a liquid crystal cell using the method of FIG. 2.
Figure 4:
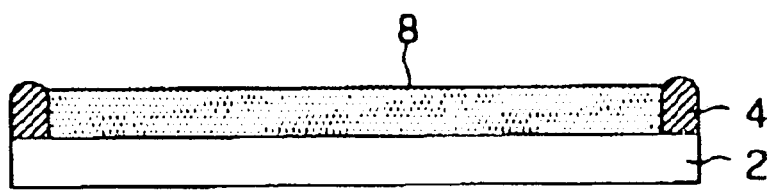
Figure 5:
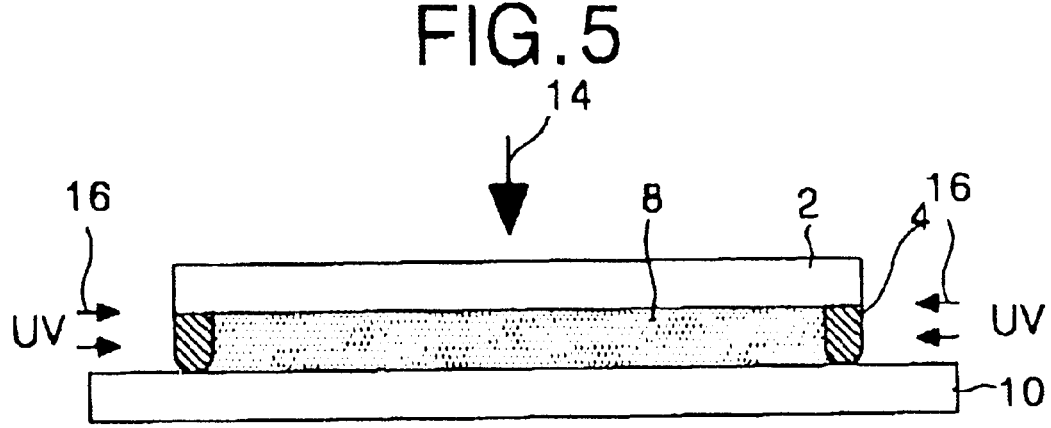

Placing the liquid crystal in the closed loop seal (step S36) is described in more detail with the assistance of FIG. 3, FIG. 4, and FIG. 5. Referring now to FIG. 3, a sealant 4 is formed on an upper substrate 2 (having color filters) in a closed loop shape. A liquid crystal injecting head 6 is then positioned such that a liquid crystal 8 (see FIG. 4) can be formed into a pool within the closed loop on the upper substrate 2. The sealant 4 itself is beneficially semisolid, possibly having a wet clay consistency, and is formed with walls 10 to 100 μm high. However, after the lower substrate is joined the wall height will be reduced to about 2 to 10 μm.

As shown in FIG. 4, with the liquid crystal injecting head 6 in position, a liquid crystal 8 is then injected into the area defined by the closed loop of the seal 4. Then, as shown in FIG. 5, a lower substrate 10 is brought into contact with the seal, and the joined structure is then flipped such that the upper substrate 2 is above the lower substrate 10. A constant pressure 14 then forces the upper substrate 2 and the lower substrate 10 together. The sealant 4 is then cured, beneficially by using ultraviolet (UV) light 16. As indicated above, the seal is compressed by the pressure, bringing the upper and lower substrates into contact with the liquid crystal 8. The separation of the upper and lower substrates is beneficially reduced to 2 to 10 μm.

Bringing the lower substrate 10 into contact with the seal 4 is beneficially performed in a vacuum chamber (not shown). This prevents air from being trapped between the upper substrate 2 and the lower substrate 10. Furthermore, by removing the vacuum, atmospheric pressure can provide all or part of the constant pressure 14. Thus, curing of the substrate 4 is beneficially performed at atmospheric pressure.

As described above, according to the principles of the present invention, a liquid crystal is placed into a closed loop space defined by a semi-solid sealant on a substrate. Another substrate is located on the sealant, beneficially in a vacuum. The sealant is then cured, beneficially under a constant pressure, using light, beneficially ultraviolet light. Since an injection hole is not required a step of sealing the injection hole can be eliminated. Additionally, as the liquid crystal can be located with leakage, a cleaning step of cleaning up the liquid crystal can be eliminated.

Although the principles of the present invention have been illustrated by the embodiment shown in the drawings and as described above, it should be understood that the invention is not limited to the embodiments, but rather that various changes or modifications thereof are possible without departing from the spirit of the invention. Accordingly, it is intended that the present invention covers all modifications and variations of this invention provided they come within the broad scope of the appended claims.

What is claimed is:

1. A method of fabricating a liquid crystal display device, comprising the steps of:

forming a closed loop pattern on a first substrate using a sealant having a semi-solid texture;

forming a pool of liquid crystal on the first substrate; and joining a second substrate to the first substrate using the sealant.

2. A method of fabricating a liquid crystal display device according to claim 1, wherein the closed loop pattern includes a wall of sealant 10 to 100 μm high.

3. A method of fabricating a liquid crystal display device according to claim 1, wherein the sealant is light cured.

4. A method of fabricating a liquid crystal display device according to claim 3, wherein the sealant is ultraviolet light cured.

5. A method of fabricating a liquid crystal display device according to claim 1, wherein joining the second substrate to the first substrate includes bringing the second substrate into contact with the sealant.

6. A method of fabricating a liquid crystal display device according to claim 5, wherein bringing the second substrate into contact with the sealant is performed in a vacuum.

7. A method of fabricating a liquid crystal display device according to claim 6, wherein the joining of the second substrate to the first substrate includes applying pressure to force the second substrate toward the first substrate.

8. A method of fabricating a liquid crystal display device according to claim 7, wherein atmospheric pressure forces the second substrate toward the first substrate.

9. A method of fabricating a liquid crystal display device according to claim 1, further including the step of cutting the joined first and second substrates into a plurality of unit cells.

10. A method of fabricating a liquid crystal display device, comprising the steps of:

coating a material for an alignment layer on a first substrate;

rubbing the coated material to form an alignment layer on the first substrate;

forming a closed loop pattern on a first substrate using a sealant having a semi-solid texture;

forming a pool of liquid crystal on the first substrate; and joining a second substrate to the first substrate using the sealant.

11. A method of fabricating a liquid crystal display device according to claim 10, including the step of locating a spacer the second substrate, wherein the spacer is located prior to joining the second substrate to the first substrate.

12. A method of fabricating a liquid crystal display device according to claim 10, including the step of forming an electrical contact on the second substrate, wherein the electrical contact is formed prior to joining the second substrate to the first substrate.

13. A method of fabricating a liquid crystal display device according to claim 10, including the step of inspecting the joined first and second substrates.

14. A method of fabricating a liquid crystal display device according to claim 10, wherein the closed loop pattern includes a wall of sealant 10 to 100 $\mu$m high.

15. A method of fabricating a liquid crystal display device according to claim 10, wherein the sealant is light cured.

16. A method of fabricating a liquid crystal display device according to claim 15, wherein the sealant is ultraviolet light cured.

17. A method of fabricating a liquid crystal display device according to claim 10, wherein joining the second substrate to the first substrate includes bringing the second substrate into contact with the sealant.

18. A method of fabricating a liquid crystal display device according to claim 17, wherein bringing the second substrate into contact with the sealant is performed in a vacuum.

19. A method of fabricating a liquid crystal display device according to claim 17, wherein the joining of the second substrate to the first substrate includes applying pressure to force the second substrate toward the first substrate.

20. A method of fabricating a liquid crystal display device according to claim 19, wherein atmospheric pressure forces the second substrate toward the first substrate.

21. A method of fabricating a liquid crystal display device according to claim 10, further including the step of cutting the joined first and second substrates into a plurality of unit cells.

22. The method of claim 15, wherein the sealant is light cured at atmospheric pressure.

* * * * *